United States Patent
Ono et al.

(10) Patent No.: US 12,034,323 B2
(45) Date of Patent: *Jul. 9, 2024

(54) BATTERY CONTROL UNIT AND BATTERY SYSTEM

(71) Applicant: Yazaki Corporation, Tokyo (JP)

(72) Inventors: Chihiro Ono, Susono (JP); Takahiro Syouda, Susono (JP)

(73) Assignee: YAZAKI CORPORATION, Tokyo (JP)

( * ) Notice: Subject to any disclaimer, the term of this patent is extended or adjusted under 35 U.S.C. 154(b) by 176 days.

This patent is subject to a terminal disclaimer.

(21) Appl. No.: 17/343,188

(22) Filed: Jun. 9, 2021

(65) Prior Publication Data

US 2021/0399558 A1    Dec. 23, 2021

(30) Foreign Application Priority Data

Jun. 19, 2020    (JP) .................. 2020-106010

(51) Int. Cl.
  *H02J 7/00*    (2006.01)
  *H02J 7/04*    (2006.01)

(52) U.S. Cl.
  CPC .......... *H02J 7/0024* (2013.01); *H02J 7/0016* (2013.01); *H02J 7/0048* (2020.01); *H02J 7/007182* (2020.01); *H02J 7/04* (2013.01)

(58) Field of Classification Search
  CPC .. H02J 7/0024; H02J 7/0048; H02J 7/007182; H02J 7/0016; H02J 7/04; H01M 10/44
  See application file for complete search history.

(56) References Cited

U.S. PATENT DOCUMENTS

| | | | | |
|---|---|---|---|---|
| 2006/0087291 A1* | 4/2006 | Yamauchi | ............ | H02J 7/0069 320/137 |
| 2007/0170896 A1* | 7/2007 | Proebstle | ............ | H02J 7/1446 322/37 |
| 2009/0251100 A1* | 10/2009 | Incledon | ............ | H02J 7/0016 320/137 |
| 2012/0094150 A1* | 4/2012 | Troutman | ............ | H01M 50/51 429/61 |
| 2013/0320992 A1* | 12/2013 | Andersson | ........... | G01R 31/382 324/434 |

(Continued)

FOREIGN PATENT DOCUMENTS

JP    2013-31249 A    2/2013

*Primary Examiner* — Drew A Dunn
*Assistant Examiner* — Pamela J Jeppson
(74) *Attorney, Agent, or Firm* — Sughrue Mion, PLLC

(57) ABSTRACT

A battery control unit includes a switching unit and a control unit. The switching unit is provided for each of a plurality of batteries connected to in series to each other, and switches a connection state in which the corresponding battery is discharged and a non-connection state in which the corresponding battery is not discharged. The control unit switches the battery to the non-connection state in order from the battery whose remaining dischargeable capacity reaches a predetermined value. Further, the control unit switches all the batteries to the connection state after the remaining dischargeable capacity of all the batteries reaches the predetermined value, and then switch the battery to the non-connection state in order from the battery determined to reach a discharge termination state.

6 Claims, 4 Drawing Sheets

(56) References Cited

U.S. PATENT DOCUMENTS

| | | | |
|---|---|---|---|
| 2014/0021923 A1* | 1/2014 | Uchida | H02J 7/0016 |
| | | | 320/118 |
| 2015/0028817 A1* | 1/2015 | Brockerhoff | H01M 10/02 |
| | | | 429/61 |
| 2015/0288199 A1* | 10/2015 | Bui-Van | B60L 3/0046 |
| | | | 320/118 |
| 2016/0218525 A1* | 7/2016 | Takao | H02J 7/005 |
| 2019/0322193 A1* | 10/2019 | Duan | B60L 58/20 |

* cited by examiner

BATTERY CONTROL UNIT AND BATTERY SYSTEM

CROSS-REFERENCE TO RELATED APPLICATIONS

This application is based on and claims priority under 35 USC 119 from Japanese Patent Application No. 2020-106010 filed on Jun. 19, 2020, the contents of which are incorporated herein by reference.

TECHNICAL FIELD

The present invention relates to a battery control unit and a battery system.

BACKGROUND ART

There is a battery system configured by connecting a plurality of batteries in series. Deterioration of the plurality of batteries varies due to, for example, a variation in manufacturing or a variation in an operating environment. For example, a battery that is close to a heat source rapidly deteriorates, while a battery that is remote from the heat source slowly deteriorates.

For this reason, a battery that has deteriorated during charging and discharging reaches a charge and discharge termination state first. In this case, even when there is remaining capacity in other batteries, charging and discharging must be stopped and a battery capacity cannot be used up. Therefore, a system has been proposed in which a battery that has reached a charge termination state is bypassed and disconnected from a charging circuit, and charging of a battery that has not reached the charge termination state is continued (Patent Literature 1). Similarly, during discharging, a battery system may be considered in which a battery that has reached a discharge termination state is bypassed and disconnected from discharging, and discharging of the battery that has not reached the discharge termination state is continued.

Incidentally, in order to prevent deterioration of the battery, it is considered to perform discharge current limitation for limiting a discharge current when a charge state of the battery becomes low. When the discharge current is limited, for example, in the case of an electric vehicle, limitation is imposed such that acceleration is weakened even when an accelerator is depressed.

When such discharge current limitation is adopted in the battery system, the following problem occurs. For example, a battery system is considered in which two batteries are connected in series. When a charge state of one of the two batteries becomes low and the discharge current limitation is required, the discharge current limitation is performed on the two batteries. Thereafter, when the battery in a low charge state reaches the discharge termination state, the battery is bypassed, and the discharge current limitation is released. Next, when the charge state of a remaining one battery becomes low and the discharge current limitation is required, the discharge current limitation is performed on the remaining one battery. Thereafter, when the remaining one battery reaches the discharge termination state, the battery is bypassed. For this reason, since the discharge current is limited every time the battery is bypassed, there is a problem that a duration time during which desired power is obtained is shortened without limiting the discharge current.

CITATION LIST

Patent Literature

Patent Literature 1: JP-A-2013-31249

SUMMARY OF INVENTION

The present invention has been made in view of the above circumstances, and an object of the present invention is to provide a battery control unit and a battery system capable of extending a duration time for which desired power is obtained.

A battery control unit and a battery system according to the present invention include: a switching unit configured to be provided for each of a plurality of batteries connected in series to each other, and switch between a connection state in which the corresponding battery is discharged and a non-connection state in which the corresponding battery is not discharged; a first control unit configured to switch the battery to the non-connection state in order from the battery whose remaining dischargeable capacity reaches a predetermined value; and a second control unit configured to switch all the batteries to the connection state after the remaining dischargeable capacities of all the batteries reach the predetermined value, and then switch the battery to the non-connection state in order from the battery determined to reach a discharge termination state.

DESCRIPTION OF EMBODIMENTS

A specific embodiment according to the present invention will be described below with reference to the drawings.

Figure 1:
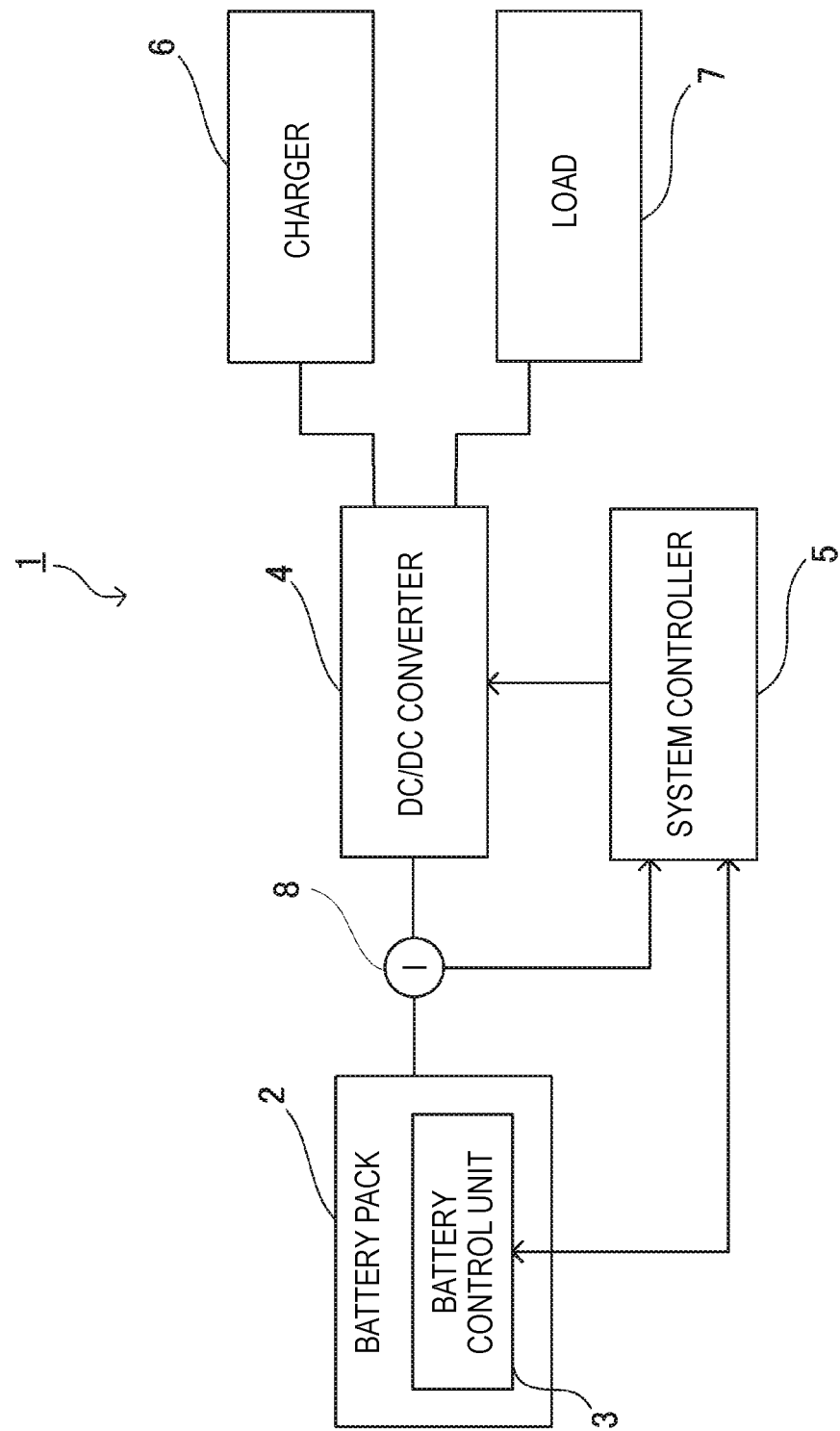
FIG. 1 is a block diagram showing a battery system according to the present invention.

A battery system 1 shown in FIG. 1 is, for example, a device that supplies power obtained by reusing a deteriorated battery.

As shown in FIG. 1, the battery system 1 includes a battery pack 2, a battery control unit 3, a power converter 4, a current measurement unit 8, a system controller 5 (discharge current limitation unit), a charger 6, and a load 7. The battery system 1 converts a voltage and a frequency of power from the battery pack 2 via the power converter 4, and then supplies (discharges) the power to the load 7. The battery system 1 converts a voltage and a frequency of power from the charger 6 via the power converter 4, and then supplies the power to the battery pack 2 to charge the battery pack 2.

Figure 2:
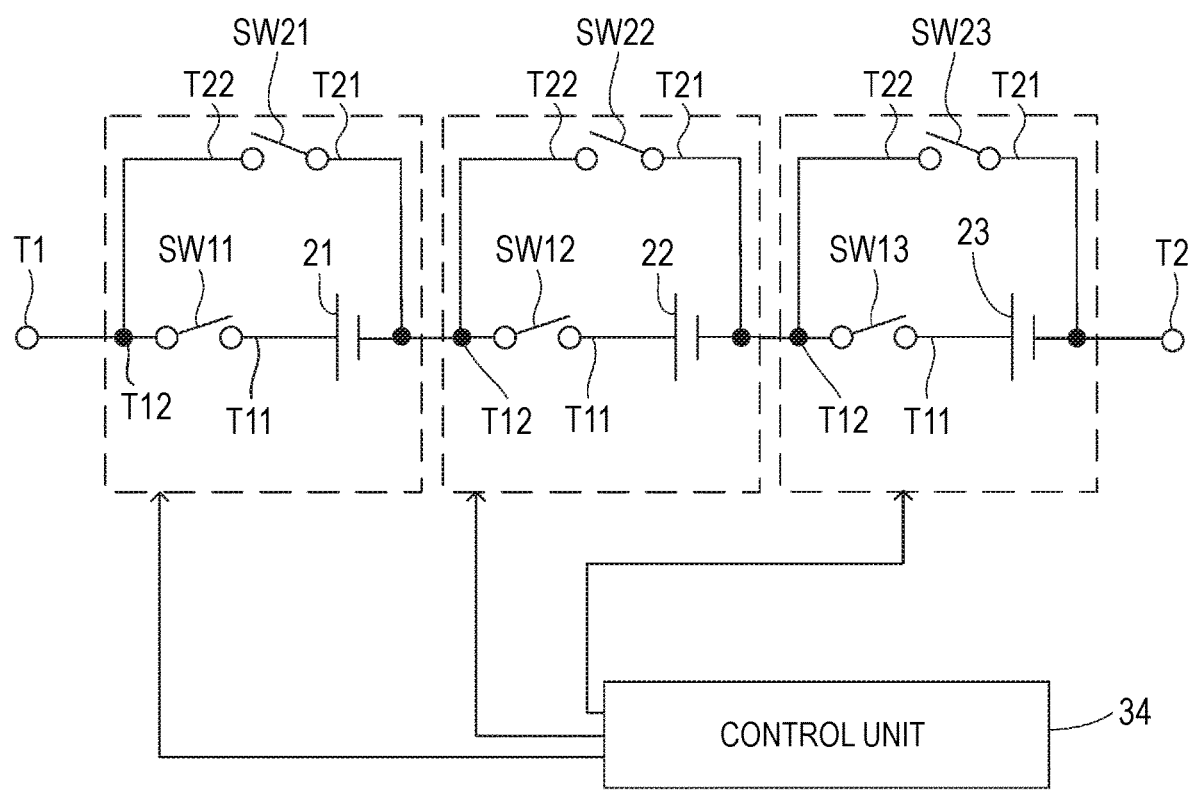
FIG. 2 is a circuit diagram showing details of a battery pack and a battery control unit shown in FIG. 1.

As shown in FIG. 2, the battery pack 2 includes a plurality of batteries 21 to 23. Although an example in which the three batteries 21 to 23 are connected in series will be described in the present embodiment to simplify the description, the present invention is not limited thereto. The number of batteries 21 to 23 may be two, or four or more as long as the number is plural. Each of the plurality of batteries 21 to 23 is a chargeable and dischargeable storage battery, and may be configured by one cell or may be configured by a plurality of cells.

The battery control unit 3 is a unit that switches connection states of the plurality of batteries 21 to 23. The battery control unit 3 includes a plurality of switching units 31 to 33 and a control unit 34 (a first control unit and a second control unit). The plurality of switching units 31 to 33 are provided corresponding to the plurality of batteries 21 to 23, respectively. The plurality of switching units 31 to 33 have the same configuration.

The switching units 31 to 33 switch between a connection state in which the corresponding batteries 21 to 23 can be connected to the charger 6 or the load 7 (can be discharged) and a non-connection state in which the corresponding batteries 21 to 23 cannot be connected to the charger 6 or the load 7 (cannot be discharged). That is, the batteries 21 to 23 in the connection state are electrically connected between a pair of terminals T1 and T2 provided in the battery pack 2, and the batteries 21 to 23 in the non-connection state are disconnected from the pair of terminals T1 and T2. Therefore, when the terminals T1 and T2 of the battery pack 2 are connected to the power converter 4, the batteries 21 to 23 in the connection state can be charged by the charger 6 or can be discharged to the load 7, and the batteries 21 to 23 in the non-connection state cannot be charged by the charger 6 or cannot be discharged to the load 7.

The switching unit 31 includes a first switch SW11 connected in series to the battery 21, and a second switch SW21 connected in parallel to the battery 21 and the first switch SW11. One end T11 of the first switch SW11 is connected to one electrode (for example, a positive electrode) of the battery 21. One end T21 of the second switch SW21 is connected to the other electrode (for example, a negative electrode) of the battery 21, and the other end T22 is connected to the other end T12 of the first switch SW11. The switching units 32 and 33 can be described by replacing "31", "SW11", and "SW21" in the description of the switching unit 31 with "32" and "33", "SW12" and "SW13", and "SW22" and "SW23", respectively, and detailed description thereof will be omitted.

The other end T12 of the first switch SW12 is connected to the negative electrode of the battery 21, and the other end T12 of the first switch SW13 is connected to the negative electrode of the battery 22. That is, the first switches SW12 and SW13 are connected between the batteries 21 and 22 and between the batteries 22 and 23 adjacent to each other, respectively.

According to the above configuration, when the second switches SW21 to SW23 are turned off and the first switches SW11 to SW13 are turned on, the corresponding batteries 21 to 23 are in the connection state. Further, when the first switches SW11 to SW13 are turned off, the corresponding batteries 21 to 23 are in the non-connection state. At this time, when the second switches SW21 to SW23 are turned on, a bypass path is formed, and only the batteries 21 to 23 in the connection state are connected between the terminals T1 and T2.

The control unit 34 includes a well-known CPU, ROM, and RAM, and controls the entire battery control unit 3. The control unit 34 detects a battery state of each of the batteries 21 to 23 based on sensors attached to respective units of the batteries 21 to 23. As the sensor, for example, a voltage sensor that detects a cell voltage (end-to-end voltage) of each of the batteries 21 to 23, a current sensor that detects a current flowing through each of the batteries 21 to 23, a temperature sensor that detects a temperature of each of the batteries 21 to 23, or the like may be considered. Examples of the battery state include a cell voltage, a current, and a temperature which are detected by the sensor, and an SOC (charge state) and an SOH (deterioration state) which are obtained based on the cell voltage, the current, and the temperature. The control unit 34 functions as a setting unit and sets a minimum discharge current limitation value based on the battery state of each of the batteries 21 to 23. The control unit 34 transmits the detected battery state of the batteries 21 to 23 and the calculated minimum discharge current limitation value to the system controller 5 to be described later.

Next, calculation of the minimum discharge current limitation value will be described. Lower limit voltage values of the batteries 21 to 23 are set in terms of performance. When the cell voltage of the batteries 21 to 23 falls below the lower limit voltage value, an electrolytic solution is decomposed and a layer of an active material is collapsed, so that the batteries 21 to 23 are greatly damaged. A closed circuit voltage (CCV), which is the cell voltage of the batteries 21 to 23 at the time of discharging, is lower than an open circuit voltage (OCV) by a voltage drop due to the internal resistance. Therefore, even when OCV does not reach the lower limit voltage value, CCV at the time of discharging may reach the lower limit voltage value.

For example, the following examples 1) and 2) will be considered.
1) When OCV=3.5V, CCV=3.0V (when I=1A), and CCV=2.6V (when I=3A)
2) When OCV=3.0V, CCV=2.6V (when I=1A), and CCV=2.0V (when I=3A)

Assuming that the lower limit voltage value of the cell voltage is 2.6V, when 3A is set to the discharge current limitation value in the case of 1), and 1A is set to the discharge current limitation value in the case of 2), it is possible to prevent CCV from falling below the lower limit voltage value of 2.6V.

That is, a discharge current at which CCV of each of the batteries 21 to 23 reaches the lower limit voltage value is the discharge current limitation value of each of the batteries 21 to 23. The smallest one of the discharge current limitation values of the batteries 21 to 23 in the connection state among the batteries 21 to 23 is the minimum discharge current limitation value. That is, the control unit 34 estimates, for each of the batteries 21 to 23, the discharge current at which CCV reaches the lower limit voltage value among the batteries 21 to 23 in the connection state, and sets the smallest one of the estimated discharge currents as the minimum discharge current limitation value.

Next, an example of setting the minimum discharge current limit value will be described. A relation among CCV, OCV, a discharge current I, and an internal resistance R is expressed by the following Equation (1).

$$OCV - R \cdot I = CCV \quad (1)$$

The control unit 34 may estimate OCV and the internal resistance R based on the battery state (cell voltage, current, temperature, SOC, SOH, and the like) of the batteries 21 to 23 by a known estimation method, and may estimate the discharge current at which CCV reaches the lower limit voltage value by substituting the estimated OCV and the internal resistance R into Equation (1). The estimated discharge current of each of the batteries 21 to 23 is set as the discharge current limitation value, and the smallest value among the discharge current limitation values of the batteries 21 to 23 in the connection state among the batteries 21 to 23 is set as the minimum discharge current value. The control unit 34 may store a table for extracting the discharge current limitation value from the battery state in advance, and may read the discharge current limitation value corresponding to the battery state of the batteries 21 to 23 from the table.

The discharge current limitation value of each of the batteries 21 to 23 is set to be increased as OCV (SOC) of each of the batteries 21 to 23 is increased. Further, the minimum discharge current limitation value is set to be decreased as the internal resistance is increased. The control unit 34 periodically detects the battery state of the batteries 21 to 23 that momentarily changes, and sets the minimum discharge current limitation value in accordance with the detected battery state every time the battery state is detected. The control unit 34 controls the switching units 31 to 33.

The power converter 4 is provided between the battery pack 2 and the charger 6 or the load 7. The power converter 4 is, for example, a DC/DC converter. The charger 6 and the load 7 are connected to the battery pack 2 via the power converter 4.

The current measurement unit 8 measures a current flowing from the battery pack 2 to the power converter 4, and outputs the measured current to the system controller 5.

The system controller 5 includes a well-known CPU, ROM, and RAM, determines a discharge output of the load 7 based on an operation command of the load 7, the battery state of the batteries 21 to 23 received from the battery control unit 3, and the minimum discharge current limitation value, and performs output control of the power converter 4. The system controller 5 obtains a discharge current consumed by the load 7 in accordance with an operation of the load 7 or the like. When the minimum discharge current limitation value falls below the discharge current consumed by the load 7, the system controller 5 outputs a control value of the minimum discharge current limitation value to the power converter 4. The power converter 4 reduces an output current and a voltage to the load 7 based on the control value of the minimum discharge current limitation value from the system controller 5, thereby making it possible to make the current output from the battery pack 2 within the minimum current limitation value. When the minimum discharge current limitation value falls below the determined discharge current consumed by the load 7 or is expected to fall below the determined discharge current consumed by the load 7, the system controller 5 transmits a limit signal indicating the fact to the battery control unit 3 before limiting the discharge current.

Figure 3:
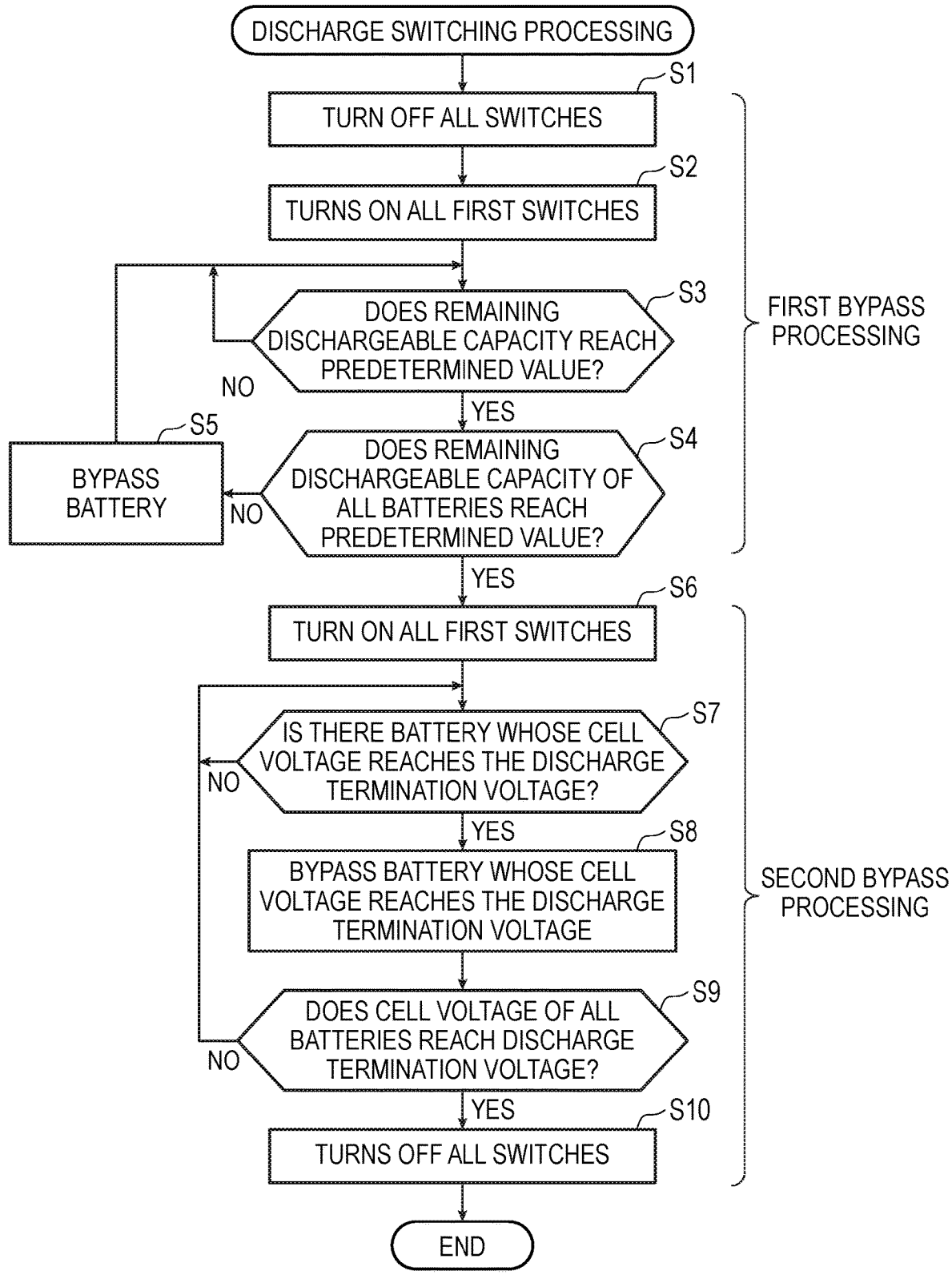
FIG. 3 is a flowchart showing a discharge switching processing procedure of a control unit constituting the battery control unit shown in FIG. 1.
Figure 4:
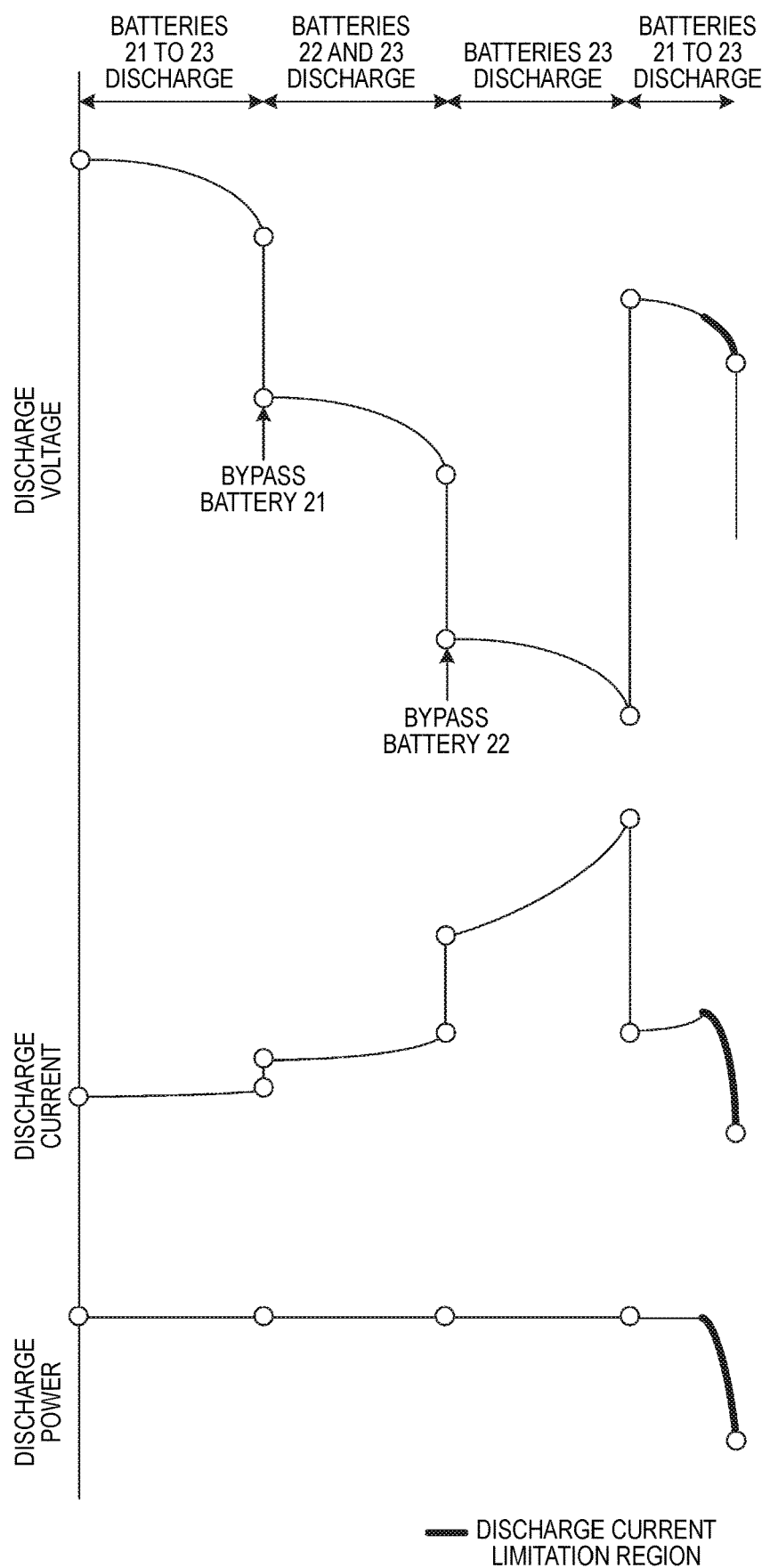
FIG. 4 is a time chart of a discharge voltage, a discharge current, and discharge power of a battery when a maximum discharge power is continuously supplied to a load in the battery system shown in FIG. 1.

Next, an operation of the battery system 1 will be described with reference to FIGS. 3 and 4. FIG. 3 is a flowchart showing a discharge switching processing procedure of the control unit 34 constituting the battery control unit 3 shown in FIG. 1. FIG. 4 is a time chart of the discharge voltage, the discharge current, and the discharge power of the batteries 21 to 23 when the maximum discharge power is continuously supplied to the load 7 in the battery system 1 shown in FIG. 1.

The control unit 34 periodically transmits the battery state of the batteries 21 to 23 and the minimum discharge current limitation value to the system controller 5 when receiving a discharge mode instruction. In parallel with this, the control unit 34 executes discharge switching processing shown in FIG. 3 when receiving the discharge mode instruction.

First, the control unit 34 turns off all the first switches SW11 to SW13 and all the second switches SW21 to SW23 (step S1). Thereafter, the control unit 34 turns on all the first switches SW11 to SW13 (step S2). As a result, the batteries 21 to 23 are in the connection state, and the batteries 21 to 23 are in the dischargeable state. For the sake of simplicity, it is assumed that the cell voltage and the remaining dischargeable capacity are decreased in order of battery 21<battery 22<battery 23.

At this time, the minimum discharge current limitation value is set to, for example, a value corresponding to the battery 21 having the lowest cell voltage. When the cell voltage of the battery 21 is decreased as the discharge progresses, the minimum discharge current limitation value is also decreased. Next, the control unit 34 obtains the remaining dischargeable capacity of each of the batteries 21 to 23 in the connection state. The remaining dischargeable capacity can be obtained based on an initial full charge capacity, SOC (remaining capacity (Ah)/full charge capacity (Ah)×100), and SOH (full charge capacity (Ah) at time of deterioration/initial full charge capacity), as shown in the following Equation (2).

$$\text{Remaining dischargeable capacity} = \text{initial full charge capacity} \times \text{SOH} \times \text{SOC} \quad (2)$$

The initial full charge capacity is a known value for each of the batteries 21 to 23, and is stored in ROM or RAM in the control unit 34. SOC and SOH can be estimated by a known method based on the battery state of the batteries 21 to 23 as described above. The control unit 34 obtains the remaining dischargeable capacity of each of the batteries 21 to 23 based on the initial full charge capacity stored in ROM or RAM and the estimated SOC and SOH. When there is a battery 21 to 23 whose remaining dischargeable capacity has reached a predetermined value (Y in step S3), the control unit 34 determines whether there is one battery 21 to 23 in the connection state (step S4). When all the batteries 21 to 23 are in the connection state, the control unit 34 determines that the number of the batteries 21 to 23 in a fully connection state is not one (N in step S4), switches the battery 21 that has the lowest remaining dischargeable capacity and has reached the predetermined value to the non-connection state and bypasses the battery 21 (step S5), and then returns to step S3.

The predetermined value is set to be larger than the remaining dischargeable capacity when the discharge current limitation is performed. For example, OCV (SOC) when the remaining dischargeable capacity reaches the predetermined value may be set to be higher than OCV (SOC) when the discharge current limitation is entered.

As a result, the batteries 22 and 23 are in the connection state, and the battery 21 is in the non-connection state. Therefore, the minimum discharge current limitation value is set to a value corresponding to, for example, the battery 22 having the lowest cell voltage among the batteries 22 and 23 in the connection state. Since the cell voltage of the battery 22 is higher than that of the battery 21, the minimum discharge current limitation value is reset to a large value by bypassing the battery 21.

Thereafter, when the remaining dischargeable capacity of the battery 22 is decreased as the discharge progresses, and the control unit 34 determines that the remaining dischargeable capacity of the battery 22 reaches the predetermined value (Y in step S3), remaining dischargeable capacity of all batteries 21 to 23 reach the predetermined value, and the control unit 34 determines whether there is one battery 21 to 23 in the connection state (step S4). When the batteries 22 and 23 are in the connection state, the control unit 34 determines that the number of the batteries 21 to 23 in the connection state is not one (N in step S4), switches the battery 22 having the lowest remaining dischargeable capacity to the non-connection state and bypasses the battery 22 (step S5), and then returns to step S3.

As a result, the battery 23 is in the connection state, and the batteries 21 and 22 are in the non-connection state. Therefore, the minimum discharge current limitation value is set to a value corresponding to the battery 23 in the connection state. Thereafter, when the remaining dischargeable capacity of the battery 23 is decreased as the discharge progresses, and the control unit 34 determines that the remaining dischargeable capacity of the battery 23 reaches the predetermined value (Y in step S3), the control unit 34 determines whether there is one battery 21 to 23 in the connection state (step S4). When only the battery 23 is in the connection state, the control unit 34 determines that the number of the batteries 21 to 23 in the connection state is one (Y in step S4), and turns on all the first switches SW11 to SW13 (step S6).

Thereafter, the control unit 34 bypasses in order from the battery 21 to 23 whose cell voltage reaches a discharge termination voltage (lower limit voltage value) (Y in step S7, S8). Then, when all the batteries 21 to 23 reach the discharge termination voltage and are bypassed (Y in step S9), the control unit 34 turns off all the first switches SW11 to SW13 and the second switches SW21 to SW23 (step S10), and ends the process.

According to the embodiment described above, the control unit 34 switches the battery to the non-connection state in order from the battery 21 to 23 whose remaining dischargeable capacities have reached the predetermined value (first bypass processing: steps S1 to S5 in FIG. 3), then switches all the batteries 21 to 23 to the connection state after the remaining dischargeable capacities of all the batteries 21 to 23 have reached the predetermined value, and then switches the battery to the non-connection state in order from the battery 21 to 23 determined to have reached the discharge termination voltage (second bypass processing: steps S6 to S10 in FIG. 3). Thus, before the second bypass processing is performed, the remaining dischargeable capacities of all the batteries 21 to 23 are equal to the predetermined value. Therefore, during the second bypass processing, theoretically, all the batteries 21 to 23 should reach the discharge termination voltage at the same timing. Therefore, during the second bypass processing in which the remaining capacity of the batteries 21 to 23 is small, it is possible to extend a time during which all the batteries 21 to 23 are in the connection state, and it is possible to extend a duration time for which a desired battery can be taken.

According to the embodiment described above, the predetermined value is set to a value so that the remaining dischargeable capacity reaches the predetermined value before the system controller 5 limits the discharge current. As a result, as shown in FIG. 4, the discharge current is not limited each time the batteries 21 to 23 are switched to the non-connection state during the first bypass processing. In addition, as described above, during the second bypass processing, all the batteries 21 to 23 reach the discharge termination voltage at the same timing, so that the discharge current limitation can be integrated into one time. Therefore, it is possible to further extend the duration time for which desired power can be obtained without limiting the discharge current, and it is possible for the control unit 34 to completely use the remaining dischargeable capacities of the batteries 21 to 23 by performing the second bypass processing.

The present invention is not limited to the above embodiment, and modifications, improvements, and the like can be made as appropriate. In addition, materials, shapes, dimensions, numbers, arrangement positions or the like of elements in the embodiment described above are optional and not limited as long as the present invention can be achieved.

According to the embodiment described above, the system controller 5 separate from the battery control unit 3 limits the discharge current, but the invention is not limited thereto. The battery control unit 3 may control the load 7 and limit the discharge current.

According to the embodiment described above, the control unit 34 estimates the remaining dischargeable capacities of the batteries 21 to 23, compares the estimated remaining dischargeable capacities with the predetermined value, and determines whether the remaining dischargeable capacities have reached the predetermined value, but the invention is not limited thereto. For example, the control unit 34 may obtain SOC, the cell voltage, or SOH (degree of deterioration) of the batteries 21 to 23, and determine whether the remaining dischargeable capacity has reached the predetermined value based on whether the obtained SOC or the cell voltage has reached a threshold value set according to SOH.

Also, according to the embodiment described above, SOC is used as the charge state, but the present invention is not limited thereto. The charge state is one of parameters indicating capacities of the batteries 21 to 23, and OCV or the like may be used in addition to SOC.

Here, characteristics of the embodiment of the battery control unit and the battery system according to the present invention described above will be briefly summarized in the following [1] to [4].

[1] A battery control unit (3), including:
a switching unit (31 to 33) configured to be provided for each of a plurality of batteries (21 to 23) connected in series to each other and switch between a connection state in which the corresponding battery (21 to 23) is discharged and a non-connection state in which the corresponding battery (21 to 23) is not be discharged;
a first control unit (34) configured to switch the battery to the non-connection state in order from the battery (21 to 23) whose remaining dischargeable capacity reaches a predetermined value; and
a second control unit (34) configured to switch all the batteries (21 to 23) to the connection state after the remaining dischargeable capacities of all the batteries (21 to 23) reach the predetermined value, and then switch the battery to the non-connection state in order from the battery determined to reach a discharge termination state.

[2] The battery control unit (3) according to [1], further including:
a discharge current limiting unit (5) configured to limit a discharge current flowing through the batteries (21 to 23) in the connection state so as not to exceed a minimum discharge current limitation value that is smallest among discharge current limitation values determined according to each battery state of the batteries (21 to 23) in the connection state, in which
the predetermined value is set to a value such that the remaining dischargeable capacity reaches the predetermined value before the discharge current limitation unit (5) limits the discharge current.

[3] The battery control unit (3) according to [2], further including:
a setting unit (34) configured to estimate a battery state and an internal resistance of each of the plurality of batteries (21 to 23) in the connection state, obtain a discharge current limitation value for each of the plurality of batteries (21 to 23) based on the estimated battery state and internal resistance of each of the plurality of the batteries (21 to 23) and a predetermined lower limit voltage value, and set a minimum value among the obtained discharge current limitation values as a minimum discharge current limitation value.

[4] A battery system (1), including:
a plurality of batteries (21 to 23) connected in series to each other;
a switching unit (31 to 33) configured to be provided for each of the plurality of batteries (21 to 23), and switch between a connection state in which the corresponding battery (21 to 23) is discharged and a non-connection state in which the corresponding battery (21 to 23) is not discharged;
a first control unit (34) configured to switch the battery to the non-connection state in order from the battery (21 to 23) whose remaining dischargeable capacity reaches a predetermined value; and
a second control unit (34) configured to switch all the batteries (21 to 23) to the connection state after the remaining dischargeable capacities of all the batteries (21 to 23) reach the predetermined value, and then switch the battery to the non-connection state in order from the battery (21 to 23) determined to reach a discharge termination state.

According to the battery control unit and the battery system having the configurations of the above [1] and [4], at a time when the second control unit switches all the batteries to the connection state, the remaining dischargeable capacities of all the batteries are equal to the predetermined value. Therefore, it is possible to extend a time during which all the batteries are in the connection state during a control period by the second control unit during which the remaining capacity of the battery is small, and it is possible to extend a duration time during which desired power can be obtained.

According to the battery control unit having the configuration of the above [2], the first control unit does not impose the discharge current limitation every time the battery is switched to the non-connection state, and it is possible to further extend the duration time during which the desired power is obtained without imposing the discharge current limitation.

According to the battery control unit having the configuration of the above [3], it is possible to easily set the minimum discharge current limitation value.

According to the present invention, it is possible to provide a battery control unit and a battery system capable of extending a duration time during which desired power can be obtained.

What is claimed is:

1. A battery control unit comprising:
a switching unit configured to be provided for each of a plurality of batteries connected in series to each other, and switch between a connection state in which the corresponding battery is discharged and a non-connection state in which the corresponding battery is not discharged;
a first control unit configured to switch the battery to the non-connection state in order from the battery whose remaining dischargeable capacity reaches a predetermined value;
a second control unit configured to switch all the batteries to the connection state after the remaining dischargeable capacity of all the batteries reaches the predetermined value, and then switch the battery to the non-connection state in order from the battery determined to reach a discharge termination state; and
a discharge current limitation unit configured to limit a discharge current flowing through the battery in the connection state so as not to exceed a minimum discharge current limitation value that is smallest among discharge current limitation values determined according to each battery state of the batteries in the connection state,
wherein the predetermined value is set to a value so that the remaining dischargeable capacity reaches the predetermined value before the discharge current limitation unit limits the discharge current.

2. The battery control unit according to claim 1, further comprising:
a setting unit configured to estimate a battery state and an internal resistance of each of the plurality of batteries in the connection state, obtain the discharge current limitation value for each of the plurality of batteries based on the estimated battery state and internal resistance of each of the plurality of batteries and a predetermined lower limit voltage value, and set a minimum value among the obtained discharge current limitation values as a minimum discharge current limitation value.

3. The battery control unit according to claim 1,
wherein the batteries comprise at least a first battery, a second battery, and a third battery.

4. The battery control unit according to claim 2,
wherein the first control unit is configured to switch the battery to the non-connection state, in order from the battery whose remaining dischargeable capacity reaches the predetermined value, in response to determining both:
that the battery whose remaining dischargeable capacity reaches the predetermined value has reached the predetermined value, and
that the remaining dischargeable capacity of all of the batteries has not reached the predetermined value.

5. The battery control unit according to claim 2,
wherein the second control unit is configured to:
switch all the batteries to the connection state in response to determining that the remaining dischargeable capacity of all the batteries has reached the predetermined value, and
switch any one of the batteries to the non-connection state in response to determining whether the remaining dischargeable capacity of any one of the batteries has reached a discharge termination state after having switched all the batteries to the connection state in response to determining that the remaining dischargeable capacity of all the batteries has reached the predetermined value.

6. A battery system comprising:
a plurality of batteries connected in series to each other;
a switching unit configured to be provided for each of the plurality of batteries, and switch between a connection state in which the corresponding battery is discharged and a non-connection state in which the corresponding battery is not discharged;
a first control unit configured to switch the battery to the non-connection state in order from the battery whose remaining dischargeable capacity reaches a predetermined value;
a second control unit configured to switch all the batteries to the connection state after the remaining dischargeable capacity of all the batteries reaches the predetermined value, and then switch the battery to the non-connection state in order from the battery determined to reach a discharge termination state; and a discharge current limitation unit configured to limit a discharge current flowing through the battery in the connection state so as not to exceed a minimum discharge current limitation value that is smallest among discharge current limitation values determined according to each battery state of the batteries in the connection state, wherein the predetermined value is set to a value so that the remaining dischargeable capacity reaches the predetermined value before a discharge current limitation unit limits a discharge current.

* * * * *